US012570405B1

(12) United States Patent
Yazici et al.

(10) Patent No.: US 12,570,405 B1
(45) Date of Patent: Mar. 10, 2026

(54) AIRCRAFT WITH ELECTRICALLY POWERED ENGINE ACCESSORIES

(71) Applicant: RTX Corporation, Farmington, CT (US)

(72) Inventors: Murat Yazici, Glastonbury, CT (US); Thomas E. Clark, Wells, ME (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/969,781

(22) Filed: Dec. 5, 2024

(51) Int. Cl.
| | |
|---|---|
| *B64D 31/18* | (2024.01) |
| *B64D 27/31* | (2024.01) |
| *B64D 27/33* | (2024.01) |

(52) U.S. Cl.
CPC ............. *B64D 31/18* (2024.01); *B64D 27/31* (2024.01); *B64D 27/33* (2024.01)

(58) Field of Classification Search
CPC ........ B64D 31/18; B64D 27/33; B64D 27/31; B64D 27/02
See application file for complete search history.

(56) References Cited

U.S. PATENT DOCUMENTS

| | | | |
|---|---|---|---|
| 7,681,402 B2 | 3/2010 | Champion | |
| 9,297,314 B2 | 3/2016 | Cloft | |
| 9,719,428 B2 | 8/2017 | Winter | |
| 2014/0090386 A1* | 4/2014 | Cloft | F02C 7/32 |
| | | | 60/801 |
| 2022/0065163 A1 | 3/2022 | Rambo | |
| 2022/0250758 A1 | 8/2022 | Devendorf | |
| 2024/0084710 A1* | 3/2024 | Trainer | H02P 9/48 |
| 2024/0263586 A1 | 8/2024 | Glessner | |
| 2025/0051018 A1* | 2/2025 | Roberts | B64D 27/33 |

* cited by examiner

*Primary Examiner* — Rodney A Bonnette
(74) *Attorney, Agent, or Firm* — Getz Balich LLC

(57) ABSTRACT

An aircraft assembly includes a fan case, a core case, an accessory gearbox, one or more electric machines, a first electric device and an electrical system. The core case is radially inboard of the fan case. The accessory gearbox is mounted with the fan case or the core case. The one or more electric machines are mounted to the accessory gearbox. The accessory gearbox is dedicated to the one or more electric machines. The first electric device is mounted with the fan case or the core case. The electrical system is electrically coupled to the one or more electric machines and the first electric device. The electrical system is configured to receive a first current of electricity from at least one of the one or more electric machines. The electrical system is configured to provide a second current of electricity to the first electric device.

20 Claims, 6 Drawing Sheets

132

Aircraft Fuselage
134

Electric Device
120

Electric Device
120

132

Aircraft Wing
136

Electric Device
120

Electric Device
120

132

Pylon Structure
156

Electric Device
120

Electric Device
120

AIRCRAFT WITH ELECTRICALLY POWERED ENGINE ACCESSORIES

BACKGROUND OF THE DISCLOSURE

1. Technical Field

This disclosure relates generally to an aircraft powerplant and, more particularly, to an electric machine system for the aircraft powerplant.

2. Background Information

An aircraft powerplant such as an aircraft propulsion system may include one or more electric machines. Various electric machine systems are known in the art. While these known electric machine systems have various benefits, there is still room in the art for improvement.

SUMMARY OF THE DISCLOSURE

According to an aspect of the present disclosure, an assembly is provided for an aircraft. This assembly includes a fan case, a core case, an accessory gearbox, one or more electric machines, a first electric device and an electrical system. The core case is radially inboard of the fan case. The accessory gearbox is mounted with the fan case or the core case. The one or more electric machines are mounted to the accessory gearbox. The accessory gearbox is dedicated to the one or more electric machines. The first electric device is mounted with the fan case or the core case. The electrical system is electrically coupled to the one or more electric machines and the first electric device. The electrical system is configured to receive a first current of electricity from at least one of the one or more electric machines. The electrical system is configured to provide a second current of electricity to the first electric device.

According to another aspect of the present disclosure, another assembly is provided for an aircraft. This assembly includes a compressor section, a combustor section, a first turbine section, a second turbine section and a flowpath extending through the compressor section, the combustor section, the first turbine section and the second turbine section from an inlet into the flowpath to an outlet from the flowpath. The assembly also includes a first rotating structure, a second rotating structure, a first electric machine, a second electric machine, an aircraft system and an electrical system. The first rotating structure includes a first turbine rotor in the first turbine section. The second rotating structure includes a second turbine rotor in the second turbine section. The first electric machine includes a first electric machine rotor that is operatively coupled to the first rotating structure through an accessory gearbox. The second electric machine includes a second electric machine rotor that is operatively coupled to the second rotating structure through the accessory gearbox. The aircraft system is configured as at least one of an actuation system, a fuel system, a lubrication system or a cooling system. The aircraft system includes a plurality of electric devices. The electrical system is electrically coupled to the first electric machine, the second electric machine and each of the electric devices.

According to another aspect of the present disclosure, another assembly is provided for an aircraft. This assembly includes a propulsion system, a first electric device and an electric system. The propulsion system includes a fan case, a core case, an accessory gearbox and one or more electric machines mounted to the accessory gearbox. The core case is radially inboard of the fan case. The accessory gearbox is mounted with the fan case or the core case. The accessory gearbox is dedicated to the one or more electric machines. The first electric device is disposed within or outside of the propulsion system. The electrical system is electrically coupled to the one or more electric machines and the first electric device. The electrical system is configured to receive a first current of electricity from at least one of the one or more electric machines. The electrical system is configured to provide a second current of electricity to the first electric device.

According to still another aspect of the present disclosure, another assembly is provided for an aircraft. This assembly includes a fan case, a core case, a first electric machine, a first electric device and an electrical system. The core case is radially inboard of the fan case. The first electric machine is mounted with the fan case. The first electric device is mounted with the core case. The electrical system is electrically coupled to the first electric machine and the first electric device. The electrical system is configured to receive a first current of electricity from the first electric machine. The electrical system is configured to provide a second current of electricity to the first electric device.

The assembly may also include a compressor section, a combustor section, a turbine section, a flowpath and a rotating structure. The flowpath may extend through the compressor section, the combustor section and the turbine section. The rotating structure may include a turbine rotor that is disposed in the turbine section. The rotating structure may be operatively coupled to a first electric machine rotor in the first electric machine.

The assembly may also include a compressor section, a combustor section, a first turbine section, a second turbine section, a flowpath, a second electric machine, a first rotating structure and a second rotating structure. The flowpath may extend through the compressor section, the combustor section, the first turbine section and the second turbine section. The second electric machine may be mounted with the fan case. The electrical system may be electrically coupled to the second electric machine. The electrical system may be configured to receive a third current of electricity from the second electric machine. The first rotating structure may include a first turbine rotor that is disposed in the first turbine section. The first rotating structure may be operatively coupled to a first electric machine rotor in the first electric machine. The second rotating structure may include a second turbine rotor that is disposed in the second turbine section. The second rotating structure may be operatively coupled to a second electric machine rotor in the second electric machine.

The assembly may also include a second electric device mounted with the core case. The electrical system is electrically coupled to the second electric device. The electrical system is configured to provide a third current of electricity to the second electric device.

The assembly may also include a first powerplant system and a second powerplant system. The first powerplant system may include the first electric device. The second powerplant system may include the second electric device. The second powerplant system may be discrete from the first powerplant system.

At least one of the electric devices may be configured as or otherwise include an electric actuator.

At least one of the electric devices may be configured as or otherwise include an electric pump.

At least one of the electric devices may be configured as or otherwise include an electric valve.

The aircraft system may be configured as at least or only the actuation system.

The aircraft system may be configured as at least or only the lubrication system.

The aircraft system may be configured as at least or only the fuel system.

The aircraft system may be configured as at least or only the cooling system.

The assembly may also include a core case housing the first rotating structure and the second rotating structure. At least one of the electric devices may be mounted with the core case.

The assembly may also include a propulsor rotor, an engine core and an engine case. The engine core may be configured to power rotation of the propulsor rotor. The engine core may include the compressor section, the combustor section, the first turbine section and the second turbine section. The engine case may house the propulsor rotor. At least one of the electric devices may be mounted with the engine case.

The assembly may also include a core case housing the first rotating structure and the second rotating structure. The accessory gearbox may be mounted with the core case.

The assembly may also include a propulsor rotor, an engine core and an engine case. The engine core may be configured to power rotation of the propulsor rotor. The engine core may include the compressor section, the combustor section, the first turbine section and the second turbine section. The engine case may house the propulsor rotor. The accessory gearbox may be mounted with the engine case.

The first electric machine may be configurable as an electric generator during a generator mode of operation. The first electric machine may be configurable as an electric motor during a motor mode of operation.

The assembly may also include a propulsor rotor, an engine core, an engine case and a first electric machine controller. The engine core may be configured to power rotation of the propulsor rotor. The engine core may include the compressor section, the combustor section, the first turbine section and the second turbine section. The engine case may house the propulsor rotor. The first electric machine controller may be electrically coupled between the first electric machine and the electrical system. The first electric machine controller may be mounted with the engine case.

The assembly may also include a pylon structure and a turbine engine mounted to the pylon structure. The turbine engine may include the compressor section, the combustor section, the first turbine section, the second turbine section, the flowpath, the first rotating structure and the second rotating structure. At least one of the electric devices may be mounted with the pylon structure.

The assembly may also include an aircraft wing. At least one of the electric devices may be mounted with the aircraft wing.

The assembly may also include an aircraft fuselage. At least one of the electric devices may be mounted with the aircraft fuselage.

The assembly may also include a second electric device, a first powerplant system and a second powerplant system. The second electric device may be mounted with the core case. The electrical system may be electrically coupled to the second electric device. The electrical system may be configured to provide a third current of electricity to the second electric device. The first powerplant system may include the first electric device. The second powerplant system may include the second electric device. The second powerplant system may be discrete from the first powerplant system.

The assembly may also include an aircraft airframe. At least one of the electric devices may be disposed within the aircraft airframe.

The assembly may also include an airframe component and a second electric device mounted with the airframe component. The electrical system may also be electrically coupled to the second electric device.

The assembly may also include an airframe component. The first electric device may be disposed outside of the propulsion system and mounted with the airframe component.

The airframe component may be configured as or otherwise include a pylon structure.

The airframe component may be configured as or otherwise include an aircraft wing.

The airframe component may be configured as or otherwise include an aircraft fuselage.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
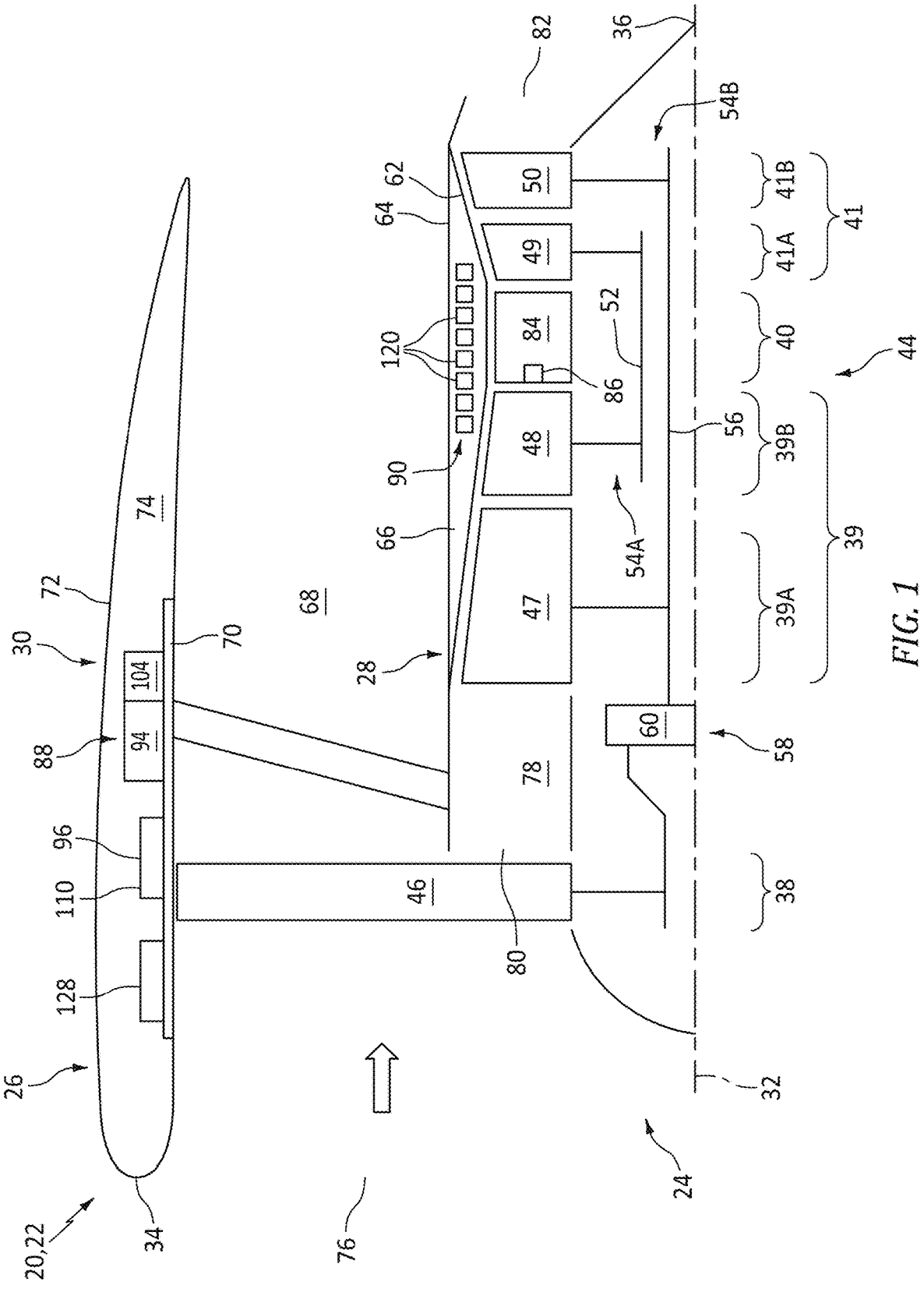
FIG. 1 is a partial schematic illustration of an aircraft propulsion system.

FIG. 1 illustrates a powerplant 20 for an aircraft. The aircraft may be an airplane, a drone (e.g., an unmanned aerial vehicle (UAV)) or any other manned or unmanned aerial vehicle or system. For ease of description, the aircraft powerplant 20 is described below as a propulsion system 22 for the aircraft and, more particularly, as a turbofan propulsion system. The aircraft powerplant 20 of the present disclosure, however, is not limited to such an exemplary aircraft propulsion system. Moreover, the aircraft powerplant 20 is not limited to propulsion system applications. The aircraft powerplant 20, for example, may also be configured as an electrical power system for the aircraft.

The aircraft propulsion system 22 includes a gas turbine engine 24 (e.g., a turbofan engine) housed within a stationary engine housing 26, which engine housing 26 of FIG. 1 includes an inner housing structure 28 and an outer housing structure 30. The aircraft propulsion system 22 extends axially along an axis 32 between an axial forward, upstream end 34 of the aircraft propulsion system 22 and an axial aft, downstream end 36 of the aircraft propulsion system 22. Briefly, the axis 32 may be a centerline axis of the aircraft propulsion system 22, the turbine engine 24 and/or one or more of its members. The axis 32 may also or alternatively be a rotational axis for one or more members of the turbine engine 24.

The turbine engine 24 of FIG. 1 includes a propulsor section 38 (e.g., a fan section), a compressor section 39, a combustor section 40 and a turbine section 41. The compressor section 39 of FIG. 1 includes a low pressure compressor (LPC) section 39A and a high pressure compressor (HPC) section 39B. The turbine section 41 of FIG. 1 includes a high pressure turbine (HPT) section 41A and a low pressure turbine (LPT) section 41B. Here, at least (or only) the LPC section 39A, the HPC section 39B, the combustor section 40, the HPT section 41A and the LPT section 41B collectively form a core 44 of the turbine engine 24.

The engine sections 38-41B may be arranged sequentially along the axis 32 within the engine housing 26. The propulsor section 38 includes a bladed propulsor rotor 46; e.g., a fan rotor. The LPC section 39A includes a bladed low pressure compressor (LPC) rotor 47. The HPC section 39B includes a bladed high pressure compressor (HPC) rotor 48. The HPT section 41A includes a bladed high pressure turbine (HPT) rotor 49. The LPT section 41B includes a bladed low pressure turbine (LPT) rotor 50. The propulsor rotor 46, the LPC rotor 47, the HPC rotor 48, the HPT rotor 49 and the LPT rotor 50 each include a rotor base (e.g., a disk or a hub) and a plurality of rotor blades (e.g., airfoils, rotor vanes, etc.). The rotor blades are arranged and may be equispaced circumferentially around the respective rotor base in one or more arrays. With this arrangement, the rotor blades may be arranged into one or more stages. Each of the rotor blades is connected to (e.g., formed integral with or otherwise attached to) the respective rotor base. Each of the rotor blades projects radially (e.g., spanwise) out from the respective rotor base to a distal tip of the respective rotor blade.

The HPC rotor 48 is coupled to and rotatable with the HPT rotor 49. The HPC rotor 48 of FIG. 1, for example, is connected to the HPT rotor 49 through a high speed shaft 52. At least (or only) the HPC rotor 48, the HPT rotor 49 and the high speed shaft 52 collectively form a high speed rotating structure 54A; e.g., a high speed spool of the engine core 44. This high speed rotating structure 54A of FIG. 1 and its members 48, 49 and 52 are rotatable about the axis 32. However, it is contemplated the high speed rotating structure 54A may alternatively be rotatable about another axis radially and/or angularly offset from the rotational axis of the propulsor rotor 46 and/or the centerline axis of the turbine engine 24.

The LPC rotor 47 is coupled to and rotatable with the LPT rotor 50. The LPC rotor 47 of FIG. 1, for example, is connected to the LPT rotor 50 through a low speed shaft 56. At least (or only) the LPC rotor 47, the LPT rotor 50 and the low speed shaft 56 collectively form a low speed rotating structure 54B; e.g., a low speed spool of the engine core 44. This low speed rotating structure 54B is further coupled to the propulsor rotor 46 through a drivetrain 58. The drivetrain 58 may be configured as a geared drivetrain, where a geartrain 60 (e.g., a transmission, a speed change device, an epicyclic geartrain, etc.) is disposed between and operatively couples the propulsor rotor 46 to the low speed rotating structure 54B and its LPT rotor 50. With this arrangement, the propulsor rotor 46 may rotate at a different (e.g., slower) rotational speed than the low speed rotating structure 54B and its LPT rotor 50. Alternatively, the drivetrain 58 may be configured as a direct-drive drivetrain, where the geartrain 60 is omitted. With such an arrangement, the propulsor rotor 46 rotates at a common (the same) rotational speed as the low speed rotating structure 54B and its LPT rotor 50. The low speed rotating structure 54B of FIG. 1 and its members 47, 50 and 56 as well as the propulsor rotor 46 are rotatable about the axis 32. However, it is contemplated the low speed rotating structure 54B may alternatively be rotatable about another axis radially and/or angularly offset from the rotational axis of the propulsor rotor 46 and/or the centerline axis of the turbine engine 24.

The inner housing structure 28 of FIG. 1 includes an inner case 62 (e.g., a core case) for the turbine engine 24, an inner nacelle structure 64 (sometimes referred to as an inner fixed structure (IFS)) and an internal inner housing compartment 66. The inner case 62 is disposed radially outboard of, extends axially along and may circumscribe one or more or all of the engine sections 39A-41B and their respective engine rotors 47-50. The inner case 62 may thereby house and provide a support structure for the respective engine sections 39A-41B and their respective engine rotors 47-50. The inner nacelle structure 64 is configured to provide an aerodynamic cover over the engine core 44 and its inner case 62. The inner housing compartment 66 of FIG. 1 is formed by and is disposed radially between the inner case 62 and an inner barrel of the inner nacelle structure 64. The inner housing structure 28 and its inner nacelle structure 64 may also form a radial inner peripheral boundary of a bypass flowpath 68 (e.g., an annular bypass flowpath) within the aircraft propulsion system 22.

The outer housing structure 30 of FIG. 1 includes an outer case 70 (e.g., a fan case) for the turbine engine 24, an outer nacelle structure 72 and an internal outer housing compartment 74. The outer case 70 is disposed radially outboard of, extends axially along and may circumscribe the propulsor section 38 and its propulsor rotor 46. The outer case 70 may thereby house and provide a containment structure for the propulsor section 38 and its propulsor rotor 46. The outer nacelle structure 72 is configured to provide an aerodynamic cover over the outer case 70. The outer housing compartment 74 of FIG. 1 is at least partially formed by and disposed radially between the outer case 70 and an outer portion (e.g., fan cowls) of the outer nacelle structure 72. The outer housing structure 30 and its outer nacelle structure 72 may also form a radial outer peripheral boundary of the bypass flowpath 68. With this arrangement, the outer housing structure 30 is spaced radially outboard from the inner housing structure 28. The outer housing structure 30 and its members 70 and/or 72 also extend axially along (e.g., axially overlap) and extend circumferentially about (e.g., circumscribe) the inner housing structure 28 and the engine core 44.

During operation, ambient air from outside of the aircraft may enter the aircraft propulsion system 22 of FIG. 1 and its turbine engine 24 through an airflow inlet 76. This air is directed across the propulsor section 38 and into a core flowpath 78 (e.g., an annular core flowpath) and the bypass flowpath 68. The core flowpath 78 of FIG. 1 extends sequentially through the LPC section 39A, the HPC section 39B, the combustor section 40, the HPT section 41A and the LPT section 41B from an airflow inlet 80 into the core flowpath 78 to a combustion products exhaust 82 out from the core flowpath 78 and the engine core 44. The air entering the core flowpath 78 may be referred to as "core air". The bypass flowpath 68 extends through a bypass duct, which bypass flowpath 68 and bypass duct bypass (e.g., are disposed radially outboard of and extend along) the engine core 44 and the inner housing structure 28. The air within the bypass flowpath 68 may be referred to as "bypass air".

The core air is compressed by the LPC rotor 47 and the HPC rotor 48 and is directed into a combustion chamber 84 (e.g., an annular combustion chamber) of a combustor (e.g., an annular combustor) in the combustor section 40. Fuel is injected into the combustion chamber 84 by one or more fuel injectors 86 and mixed with the compressed core air to provide a fuel-air mixture. This fuel-air mixture is ignited and combustion products thereof flow through and sequentially drive rotation of the HPT rotor 49 and the LPT rotor 50 about the axis 32. The rotation of the HPT rotor 49 and the LPT rotor 50 respectively drive rotation of the HPC rotor 48 and the LPC rotor 47 about the axis 32 and, thus, compression of the air received from the core inlet 80. The rotation of the LPT rotor 50 also drives rotation of the propulsor rotor 46. The rotation of the propulsor rotor 46 propels the bypass air through and out of the bypass flowpath 68. The propulsion of the bypass air may account for a majority of thrust generated by the turbine engine 24 of FIG. 1.

While the turbine engine 24 is described above with a particular two rotating structure arrangement, the present disclosure is not limited thereto. For example, the LPC rotor 47 may be omitted to configure the LPT rotor 50 as a power turbine (PT) rotor for the propulsor rotor 46. In another example, the turbine engine 24 may also include another rotating structure; e.g., an intermediate speed spool for the engine core 44.

Figure 2:
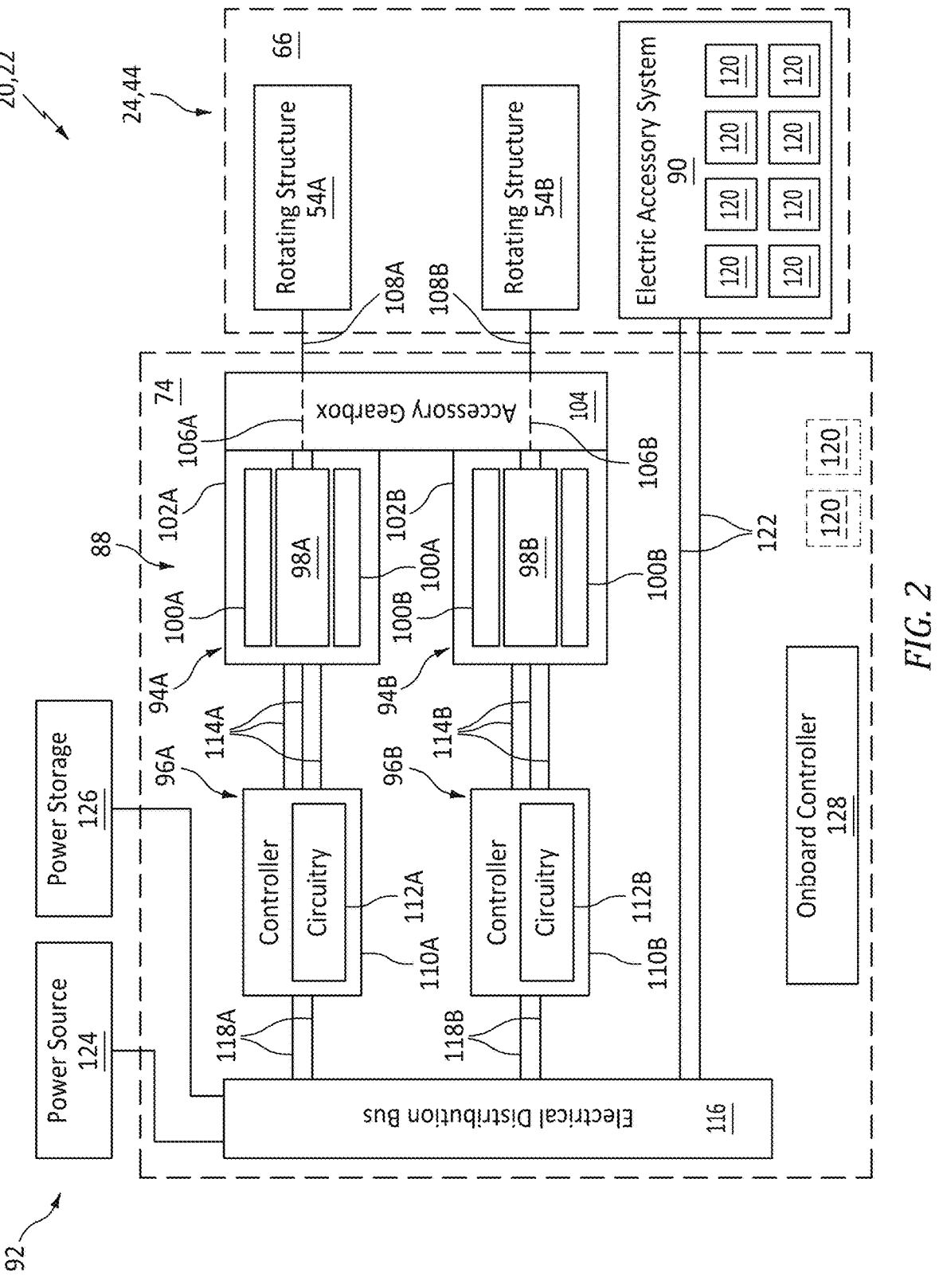
FIG. 2 is a schematic illustration of a portion of the aircraft propulsion system with an electric machine system and an electric accessory system coupled to an aircraft electrical system.

Referring to FIG. 2, the aircraft propulsion system 22 also includes an electric machine system 88 and an electric accessory system 90 electrically coupled to an electrical system 92 for the aircraft and its aircraft propulsion system 22. The electric machine system 88 of FIG. 2 includes one or more electric machines 94A and 94B (generally referred to as "94") and one or more electric machine (EM) controllers 96A and 96B (generally referred to as "96"). For ease of description, each electric machine 94 of FIG. 2 is described below as being electrically coupled to, controlled by and/or otherwise associated with a single, dedicated one of the EM controllers 96. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 94A, 94B of FIG. 2 includes an electric machine rotor 98A, 98B (generally referred to as "98"), an electric machine stator 100A, 100B (generally referred to as "100") and an electric machine housing 102A, 102B (generally referred to as "102"); e.g., a case. The machine rotor 98 is rotatable about a rotational axis of the machine rotor 98, which rotational axis may also be an axial centerline of the electric machine 94. The machine stator 100 of FIG. 2 is radially outboard of and circumscribes the machine rotor 98. With this arrangement, each electric machine 94 is configured as a radial flux electric machine. The electric machines 94 of the present disclosure, however, are not limited to such an exemplary rotor-stator configuration nor to radial flux arrangements. The machine rotor 98, for example, may alternatively be radially outboard of and circumscribe the machine stator 100. In another example, the machine rotor 98 may be axially next to the machine stator 100 configuring the respective electric machine 94 as an axial flux electric machine. Referring again to FIG. 2, the machine rotor 98 and the machine stator 100 are at least partially or completely housed within and interior of the machine housing 102.

The electric machines 94 may be mounted to a common stationary component of the aircraft propulsion system 22. Each electric machine 94 of FIG. 2, for example, is mounted to a gearbox 104 (e.g., an accessory gearbox) for the turbine engine 24. Referring to FIG. 1, the gearbox 104 may be disposed within the outer housing compartment 74. The gearbox 104 of FIG. 1, for example, is located radially outboard of and next to the outer case 70, and the gearbox 104 is also mounted to the outer case 70. Each electric machine 94 is thereby disposed within the outer housing compartment 74 and mounted with the outer housing structure 30 and its outer case 70; e.g., at least indirectly mounted to the outer case 70 through the gearbox 104. With this arrangement, each electric machine 94 is disposed in a relatively cool portion of the aircraft propulsion system 22 and remote from the relatively hot engine core 44.

Referring to FIG. 2, each electric machine 94A, 94B is operatively coupled to a respective one of the engine rotating structures 54A, 54B (generally referred to as "54") through the gearbox 104. Each machine rotor 98A, 98B of FIG. 2, for example, is mechanically coupled to a respective gear system 106A, 106B (generally referred to as "106") of the gearbox 104, and the gearbox gear system 106A, 106B is mechanically coupled to the respective engine rotating structure 54A, 54B through a respective drivetrain 108A, 108B (generally referred to as "108"). This drivetrain 108 may be configured as or otherwise include a shaft, a tower shaft assembly, another gearbox (e.g., an angle gearbox), and/or the like. For ease of description, each machine rotor 98 of FIG. 2 is described below as being coupled to and rotatable with a unique one of the engine rotating structures 54 of the aircraft propulsion system 22. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system.

Each electric machine 94 of FIG. 2 may be configurable as an electric motor and/or an electric generator; e.g., an electric motor-generator. For example, during a motor mode of operation, a respective electric machine 94 may operate as the electric motor to convert electricity received from the aircraft electrical system 92. The machine stator 100, for example, may generate an electromagnetic field with the machine rotor 98 using a current of electricity received from the aircraft electrical system 92 through the respective EM controller 96. This electromagnetic field may drive rotation of the machine rotor 98. The machine rotor 98, in turn, may provide mechanical power to and drive rotation of the respective engine rotating structure 54 through the respective drivetrain 108. This mechanical power may be provided to boost power or completely power the rotation of the respective engine rotating structure 54. By contrast, during a generator mode of operation, the electric machine 94 may operate as the electric generator to convert mechanical power received from the respective engine rotating structure 54 into electricity. Rotation of the machine rotor 98, for example, may be rotationally driven by rotation of the respective engine rotating structure 54 through the respective drivetrain 108. The rotation of the machine rotor 98 may generate an electromagnetic field with the machine stator 100, and the machine stator 100 may convert energy from the electromagnetic field into electricity. The respective electric machine 94 may then provide a current of electricity to the aircraft electrical system 92 through the respective EM controller 96 for storage and/or further use. The electric machines 94 of the present disclosure, however, are not limited to such exemplary operation. For example, one, some or all of the electric machines 94 may alternatively each be configured as a dedicated electric generator; e.g., without the electric motor functionality.

Each EM controller 96 includes a controller housing 110A, 110B (generally referred to as "110") and internal controller circuitry 112A, 112B (generally referred to as "112"). The controller housing 110 may be configured as an enclosed case (e.g., a closed or sealed container) for the respective controller circuitry 112. The controller circuitry 112 is disposed within an interior of the controller housing 110; e.g., an internal chamber or other volume(s) within and enclosed by the controller housing 110. The controller circuitry 112 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), processing device(s), memory module(s), communication module(s), electrical transformer(s), electrical rectifier(s), and/or the like.

Each EM controller 96 is electrically coupled to a respective one of the electric machines 94 through one or more electric cables 114A, 114B (generally referred to as "114"); e.g., high voltage electric cables, power feeder cables, etc. More particularly, the controller circuitry 112 of each EM controller 96 is electrically coupled to the respective electric machine 94 and its machine stator 100 through the respective electric cables 114. Similarly, each EM controller 96 is electrically coupled to an electrical distribution bus 116 of the aircraft electrical system 92 through one or more electric cables 118A, 118B (generally referred to as "118"); e.g., high voltage electric cables, power feeder cables, etc. More particularly, the controller circuitry 112 of each EM controller 96 is electrically coupled to the aircraft electrical system 92 and its electrical distribution bus 116 through the respective electric cables 118.

Each EM controller 96 and its controller circuitry 112 are configured to control operation of a respective one of the electric machines 94. For example, when operating as the electric motor, the respective EM controller 96 and its controller circuitry 112 are configured to regulate a flow of electricity from the aircraft electrical system 92 to the respective electric machine 94. This electricity flow regulation may include: (a) turning-on the flow of electricity from the aircraft electrical system 92 to the respective electric machine 94 (e.g., electrically coupling the respective electric machine 94 to the aircraft electrical system 92); (b) turning-off the flow of electricity from the aircraft electrical system 92 to the respective electric machine 94 (e.g., electrically decoupling the respective electric machine 94 from the aircraft electrical system 92); (c) moderating the flow of electricity from the aircraft electrical system 92 to the respective electric machine 94. Here, the respective EM controller 96 operates as a motor controller. In another example, when operating as the electric generator, the respective EM controller 96 and its controller circuitry 112 are configured to regulate a flow of electricity from the respective electric machine 94 to the aircraft electrical system 92. This electricity flow regulation may include: (a) turning-on the flow of electricity from the respective electric machine 94 to the aircraft electrical system 92 (e.g., electrically coupling the respective electric machine 94 to the aircraft electrical system 92); (b) turning-off the flow of electricity from the respective electric machine 94 to the aircraft electrical system 92 (e.g., electrically decoupling the respective electric machine 94 from the aircraft electrical system 92); (c) moderating the flow of electricity from the respective electric machine 94 to the aircraft electrical system 92. Here, the respective EM controller 96 operates as a generator controller.

The EM controllers 96 may be disposed within the outer housing compartment 74. Each EM controller 96 of FIG. 1, for example, is located radially outboard of and next to the outer case 70, and each EM controller 96 and its controller housing 110 is mounted to the outer case 70. This mounting of the respective EM controller 96 to the outer case 70 may be a direct mounting or an indirect mounting through an intermediate mounting structure.

Referring to FIG. 2, the electric accessory system 90 includes one or more electric devices 120. The electric devices 120 may include one or more electric actuators, one or more electric pumps, one or more electric valves and/or one or more fluid separator(s) (e.g., de-oiler(s)). The electric actuator(s) may include one or more electric linear actuators and/or one or more electric rotary actuators. The electric pump(s) may include one or more electric liquid pumps and/or one or more electric gas pumps (e.g., electric air compressor(s)). The electric devices 120 of FIG. 2 may be configured as part of one or more sub-systems for the aircraft propulsion system 22 and its turbine engine 24. Examples of these sub-systems include, but are not limited to: a fuel system for delivering the fuel to the fuel injectors 86 (see FIG. 1); a lubrication system for delivering lubricant (e.g., oil) to one or more lubricated components (e.g., bearing(s), gear system(s), seal system(s), etc.) of the aircraft propulsion system 22 and its turbine engine 24; a cooling system for delivering coolant (e.g., liquid coolant, air, etc.) to one or more fluid cooled components of the aircraft propulsion system 22 and its turbine engine 24; and an actuation system for moving one or more adjustable components (e.g., variable guide vanes, a variable area nozzle, etc.) of the aircraft propulsion system 22 and its turbine engine 24. One, some or all of these sub-systems may be discrete (e.g., operationally, mechanically, fluidly, etc. independent) from one another. Alternatively, some of the sub-systems may be integrated to share, for example, a common working fluid such as the lubricant or the fuel. The present disclosure, however, is not limited to the foregoing exemplary electric devices or sub-systems which may include those electric devices.

Each electric device 120 is electrically coupled to the electrical distribution bus 116 of the aircraft electrical system 92 through one or more electric cables 122 (collectively schematically shown); e.g., high voltage electric cables, low voltage electric cables, power feeder cables, etc. Each electric device 120 may thereby receive a current of electricity from the aircraft electrical system 92 to power operation thereof.

The electric accessory system 90 and its electric devices 120 may be disposed within the inner housing compartment 66. Each electric device 120 of FIG. 1, for example, is located radially outboard of and next to the inner case 62. Each electric device 120 is mounted with the inner case 62. This mounting of the respective electric device 120 to the inner case 62 may be a direct mounting or an indirect mounting through an intermediate mounting structure. By arranging each electric device 120 with the inner case 62 in the inner housing compartment 66, that electric device 120 may be located in closer proximity to the component(s)/ system(s) being actuated and/or serviced. The present disclosure, however, is not limited to such an exemplary arrangement. The present disclosure, however, is not limited to such an exemplary arrangement. For example, in other embodiments, one or more of the electric devices 120 may alternatively be arranged elsewhere within the aircraft propulsion system 22 and/or within compartments of the aircraft associated with the aircraft propulsion system 22 (e.g., a pylon, a wing, a fuselage, etc.) as described below in further detail.

Referring to FIG. 2, the aircraft electrical system 92 includes the electrical distribution bus 116. This aircraft electrical system 92 may also include a power source 124 and/or a power storage 126. The electrical distribution bus 116 is electrically coupled to each of the electric machines 94 through their respective EM controllers 96. The electrical distribution bus 116 is electrically coupled to each of the electric devices 120. The electrical distribution bus 116 is also electrically coupled to the power source 124 and the power storage 126. With this arrangement, the electrical distribution bus 116 provides an intermediate connection between the various electrical aircraft propulsion system members 96A, 96B, 120, 124 and/or 126. The power source 124 may be an electric generator powered by the turbine engine 24 (see FIG. 1) or an electric generator powered by another aircraft powerplant; e.g., an engine of a companion aircraft propulsion system, an engine of an auxiliary power unit (APU), a fuel cell system, etc. The power storage 126 is configured to receive electricity from the electrical distribution bus 116 for storage. The power storage 126 is also configured to provide the stored electricity to the electrical distribution bus 116. The power storage 126, for example, may be configured as or otherwise include one or more electricity storage devices; e.g., batteries, super capacitors, etc. With the foregoing aircraft electrical system arrangement, the electrical current provided to one, some or all of the electric devices 120 may be received, through the electrical distribution bus 116, from any one, some or all of the electrical aircraft propulsion system members 96A, 96B, 124 and/or 126.

The aircraft propulsion system 22 may also include an onboard controller 128 to coordinate and/or directly control operation of the electric machine system 88 and/or the electric accessory system 90. Examples of the onboard controller 128 include, but are not limited to, an electronic engine controller (EEC), an electronic control unit (ECU), and a full-authority digital engine controller (FADEC). Like the EM controllers 96, the onboard controller 128 (as well as other aircraft electronics) may be mounted with the outer case 70 within the outer housing compartment 74; see also FIG. 1.

By arranging the components (e.g., 94, 96, 104 and/or 128) with the outer housing structure 30 (e.g., within the outer housing compartment 74), within the pylon, wing, and/or fuselage, these components (e.g., 94, 96, 104 and/or 128) may be located in a cooler environment. In addition, by reducing a number of components located within the inner housing structure 28 (e.g., within the inner housing compartment 66), an exterior aerodynamic surface of the outer nacelle structure 72 may be positioned radially closer to the inner case 62.

In some embodiments, the electric machines 94 may be the only external components mounted to and operatively coupled to the gearbox 104. Thus, the gearbox 104 may be dedicated to the electric machines 94. However, in other embodiments, it is contemplated one or more additional engine accessories may also be mounted to and operatively coupled to the gearbox 104 and, more particularly, to one or both of the rotating structures 54.

In some embodiments, referring to FIGS. 1 and 2, the electric machine system members 94A, 94B, 96A and 96B and the gearbox 104 may be disposed within the outer housing compartment 74 and mounted with the outer case 70. The present disclosure, however, is not limited to such an exemplary arrangement. For example, referring to FIG. 3, any one or more of the electric machine system members 94A, 94B, 96A and/or 96B and the gearbox 104 may be disposed within the inner housing compartment 66; e.g., mounted with the inner case 62 of FIG. 1. Moreover, while the electric devices 120 are generally described above as being located with the inner housing structure 28 of FIG. 1 (e.g., within the inner housing compartment 66), it is contemplated one or more or all of the electric devices 120 may be located elsewhere with the aircraft propulsion system 22. For example, referring to FIGS. 2 and 3, one or more of the electric devices (see dashed line devices 120) may also or alternatively be arranged within the outer housing compartment 74 (e.g., with the outer housing structure 30 of FIG. 1).

Figure 4:
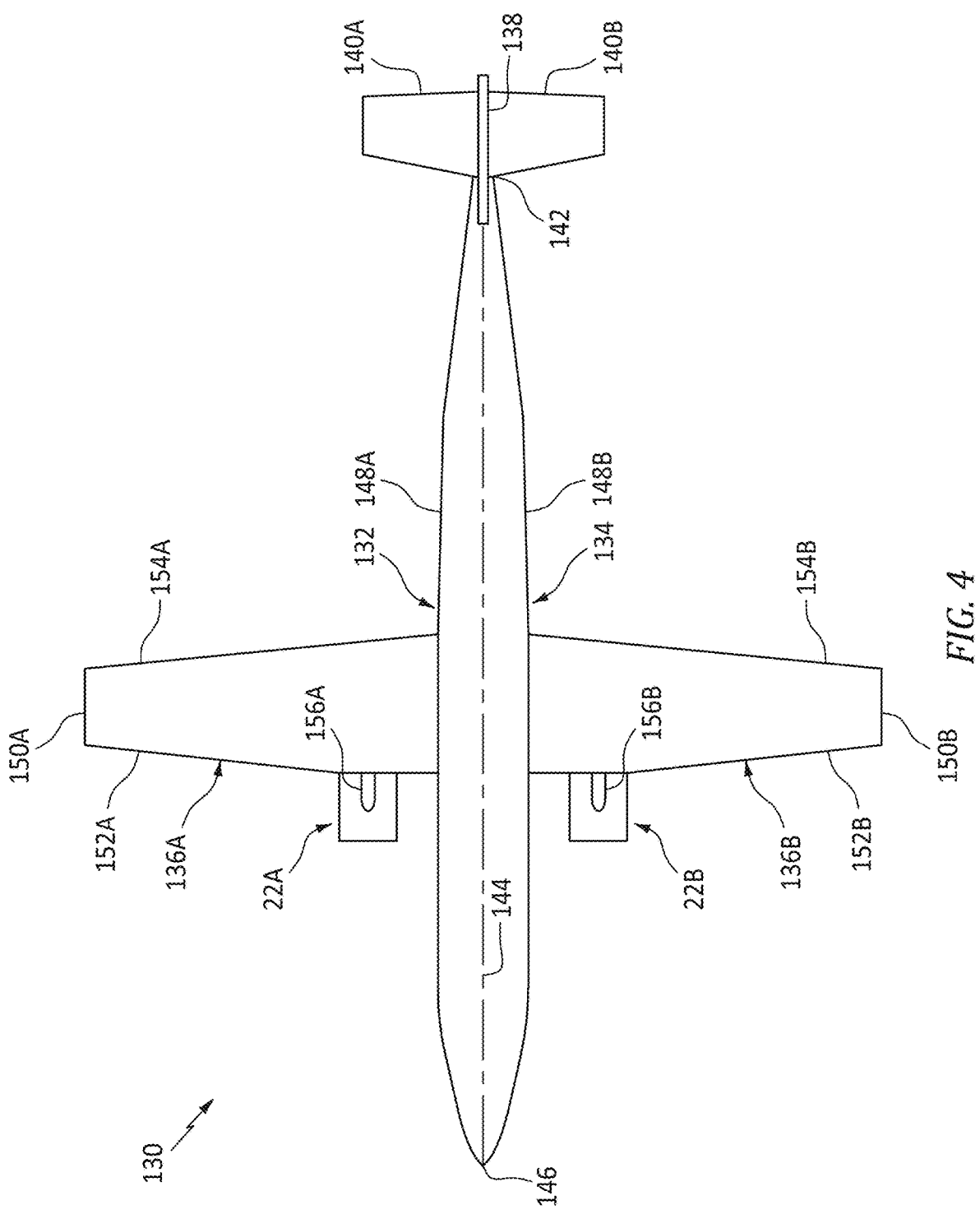
FIG. 4 is a schematic illustration of an aircraft with multiple propulsion systems mounted to wings of the aircraft.

FIG. 4 is a schematic illustration of an aircraft 130 with which one or more of the aircraft propulsion systems 22 described herein may be included. This aircraft 130 includes an aircraft airframe 132 and the one or more aircraft propulsion systems 22A and 22B (generally referred to as "22"); e.g., a pair of companion aircraft propulsion systems.

The aircraft airframe 132 of FIG. 4 includes an aircraft fuselage 134 and one or more aircraft wings 136A and 136B (generally referred to as "136"). This aircraft airframe 132 may also include one or more aircraft stabilizers, such as at least one vertical stabilizer 138 and one or more horizontal stabilizers 140A and 140B (generally referred to as "140") arranged at (e.g., on, adjacent or proximate) an aft, downstream tail end 142 of the aircraft fuselage 134. However, in other embodiments, it is contemplated one or more of the aircraft stabilizers 138, 140A and/or 140B may be omitted where, for example, the aircraft 130 is alternatively configured as a blended wing aircraft.

The aircraft fuselage 134 extends longitudinally along a longitudinal centerline 144 of the aircraft airframe 132 and its aircraft fuselage 134 from a forward, upstream nose end 146 of the aircraft airframe 132 and its aircraft fuselage 134 to the fuselage tail end 142. The aircraft fuselage 134 extends laterally between and to opposing lateral sides 148A and 148B (generally referred to as "148") of the aircraft fuselage 134.

The aircraft wings 136 are arranged to the opposing lateral sides 148 of the aircraft fuselage 134. The first aircraft wing 136A of FIG. 4, for example, is connected to the aircraft fuselage 134 at the fuselage first side 148A. The second aircraft wing 136B is connected to the aircraft fuselage 134 at the fuselage second side 148B. The aircraft fuselage 134 of FIG. 4 is thereby located laterally between the first aircraft wing 136A and the second aircraft wing 136B. Each of these aircraft wings 136A, 136B projects spanwise out from the aircraft fuselage 134 to a tip 150A, 150B of the respective aircraft wing 136A, 136B. Each of the aircraft wings 136A, 136B extends longitudinally between and to a leading edge 152A, 152B of the respective aircraft wing 136A, 136B and a trailing edge 154A, 154B of the respective aircraft wing 136A, 136B.

Figure 5:
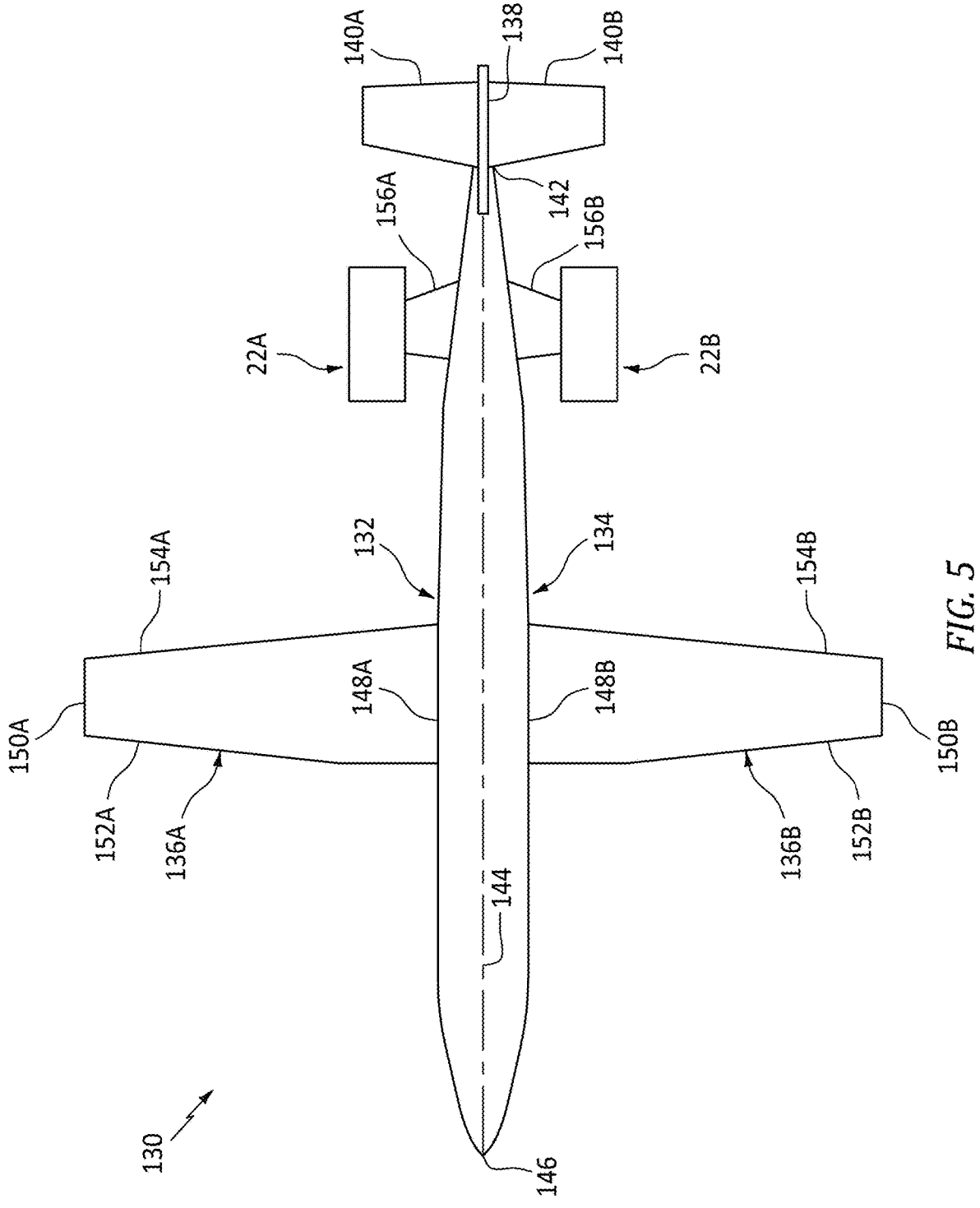
FIG. 5 is a schematic illustration of the aircraft with its propulsion systems mounted to a fuselage of the aircraft.

The aircraft propulsion systems 22 of FIG. 4 are arranged to the opposing lateral sides 148 of the aircraft fuselage 134. The first aircraft propulsion system 22A of FIG. 4, for example, is mounted to the first aircraft wing 136A by a first pylon structure 156A. The second aircraft propulsion system 22B is mounted to the second aircraft wing 136B by a second pylon structure 156B. The aircraft fuselage 134 of FIG. 4 is thereby located laterally between the first aircraft propulsion system 22A and the second aircraft propulsion system 22B. The present disclosure, however, is not limited to such an exemplary arrangement. For example, referring to FIG. 5, the first aircraft propulsion system 22A may alternatively be mounted to the aircraft fuselage 134 at the fuselage first side 148A by the first pylon structure 156A. The second aircraft propulsion system 22B may alternatively be mounted to the aircraft fuselage 134 at the fuselage second side 148B by the second pylon structure 156B.

Figure 3:
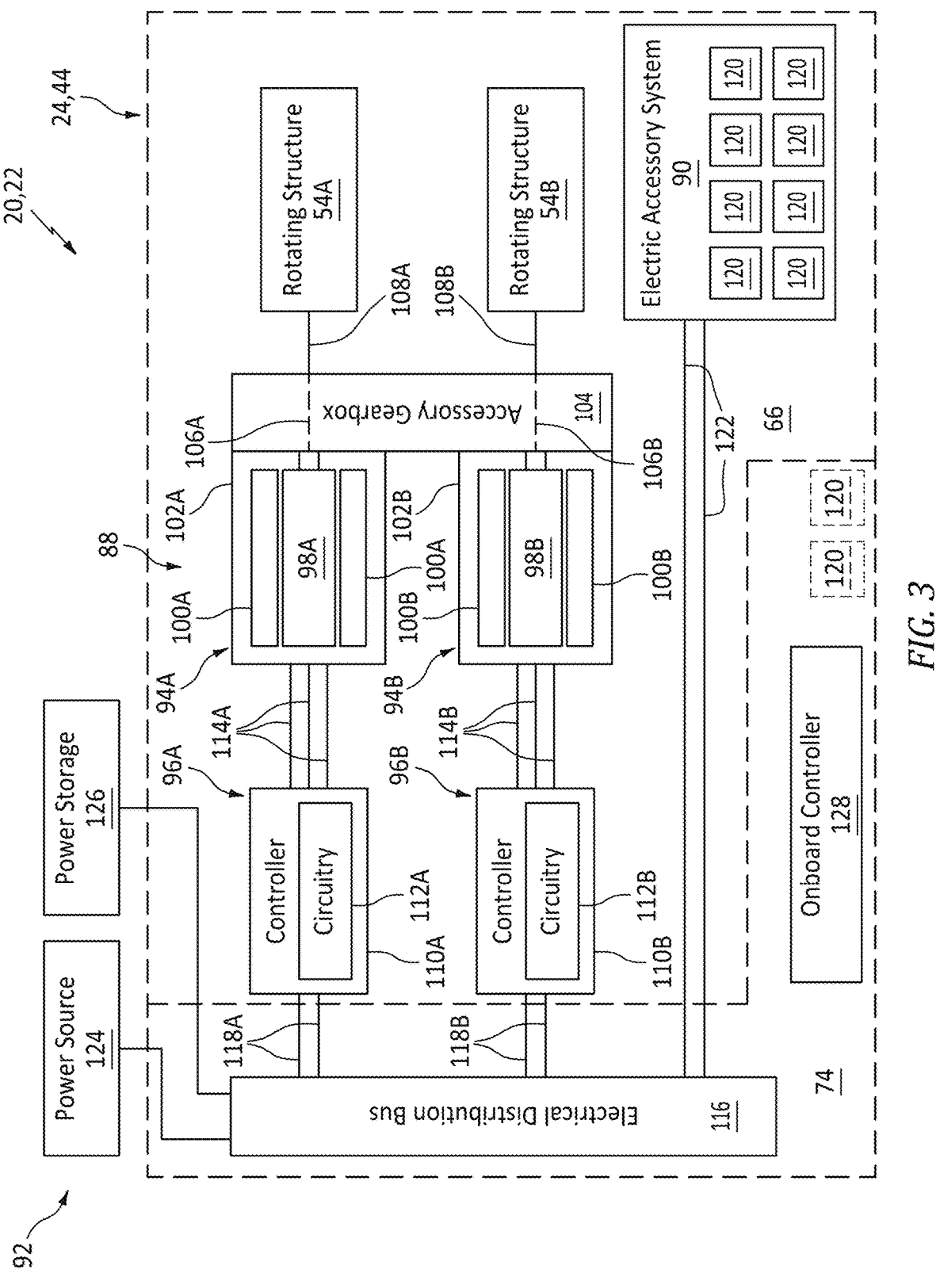
FIG. 3 is a schematic illustration of a portion of the aircraft propulsion system with an alternative arrangement electric machine system and electric accessory system coupled to the aircraft electrical system.
Figures 6, 7, 8:
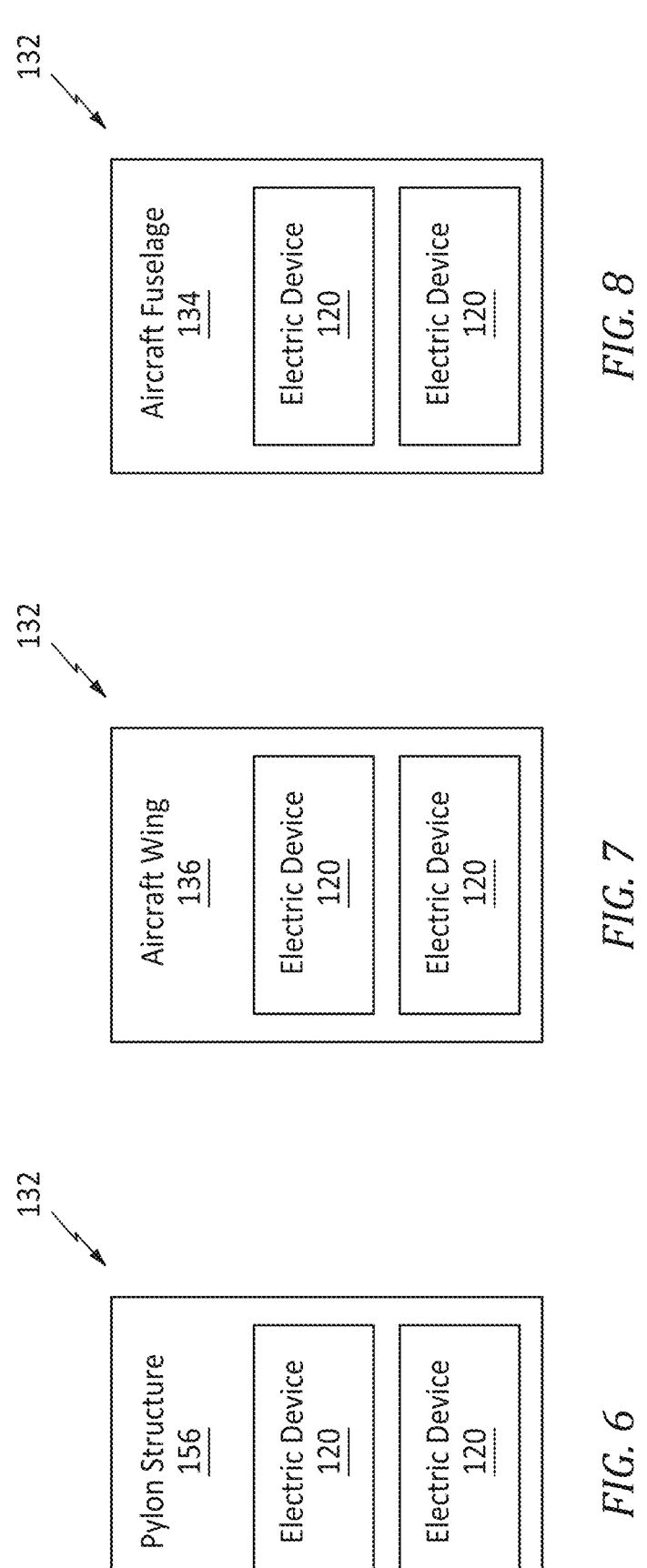
FIGS. 6-8 are schematic illustrations depicting various locations in which one or more electric devices may be disposed outside of the aircraft propulsion system.

In some embodiments, referring to FIGS. 2 and 3, each of the electric devices 120 may be mounted to, disposed within and/or otherwise arranged with the respective aircraft propulsion system 22. In other embodiments, referring to FIG. 6, any one or more or all of the electric devices 120 may alternatively (or also) be mounted to, disposed within and/or otherwise arranged with the respective pylon structure 156A, 156B (generally referred to as "156") to which the respective aircraft propulsion system 22A, 22B is mounted. Referring to FIG. 7, any one or more or all of the electric devices 120 may alternatively (or also) be mounted to, disposed within and/or otherwise arranged with one or more of the aircraft wings 136. Referring to FIG. 8, any one or more or all of the electric devices 120 may alternatively (or also) be mounted to, disposed within and/or otherwise arranged with another portion of the aircraft airframe 132 such as the aircraft fuselage 134. While any one, some or all of the electric devices 120 may be mounted outside of the respective aircraft propulsion system 22 (e.g., with 134, 136 and/or 156), electric devices such as fuel pump(s) and/or hydraulic pump(s) may be particularly suited to being located outside of the respective aircraft propulsion system 22 (see FIGS. 2 and 3). This may facilitate packaging, positioning the respective electric device 120 closer to a fluid source and/or a fluid destination, etc.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft, comprising:
a compressor section, a combustor section, a first turbine section, a second turbine section and a flowpath extending through the compressor section, the combustor section, the first turbine section and the second turbine section from an inlet into the flowpath to an outlet from the flowpath;
a first rotating structure comprising a first turbine rotor in the first turbine section;
a second rotating structure comprising a second turbine rotor in the second turbine section;
a first electric machine comprising a first electric machine rotor that is operatively coupled to the first rotating structure through an accessory gearbox, wherein the first electric machine is mounted to the accessory gearbox;

a second electric machine comprising a second electric machine rotor that is operatively coupled to the second rotating structure through the accessory gearbox, wherein the second electric machine is mounted to the accessory gearbox;
an aircraft system configured as at least one of an actuation system, a fuel system, a lubrication system or a cooling system, the aircraft system comprising a plurality of electric devices; and
an electrical system electrically coupled to the first electric machine, the second electric machine and each of the plurality of electric devices.

2. The assembly of claim 1, wherein at least one of the plurality of electric devices comprises an electric actuator.

3. The assembly of claim 1, wherein at least one of the plurality of electric devices comprises an electric pump.

4. The assembly of claim 1, wherein at least one of the plurality of electric devices comprises an electric valve.

5. The assembly of claim 1, further comprising:
a core case housing the first rotating structure and the second rotating structure;
at least one of the plurality of electric devices mounted within the core case.

6. The assembly of claim 1, further comprising:
a fan rotor;
an engine core configured to power rotation of the fan rotor, the engine core including the compressor section, the combustor section, the first turbine section and the second turbine section; and
a fan case housing the fan rotor;
at least one of the plurality of electric devices mounted with the fan case.

7. The assembly of claim 1, further comprising:
a pylon structure; and
a turbine engine mounted to the pylon structure, the turbine engine including the compressor section, the combustor section, the first turbine section, the second turbine section, the flowpath, the first rotating structure and the second rotating structure;
at least one of the plurality of electric devices mounted with the pylon structure.

8. The assembly of claim 1, further comprising an aircraft wing, at least one of the plurality of electric devices mounted with the aircraft wing.

9. The assembly of claim 1, further comprising an aircraft fuselage, at least one of the plurality of electric devices mounted with the aircraft fuselage.

10. The assembly of claim 1, further comprising an aircraft airframe, at least one of the plurality of electric devices disposed within the aircraft airframe.

11. The assembly of claim 1, further comprising:
a core case housing the first rotating structure and the second rotating structure;
the accessory gearbox mounted with the core case.

12. The assembly of claim 1, further comprising:
a propulsor rotor;
an engine core configured to power rotation of the propulsor rotor, the engine core including the compressor section, the combustor section, the first turbine section and the second turbine section; and
an engine case housing the propulsor rotor;
the accessory gearbox mounted with the engine case.

13. The assembly of claim 1, wherein at least one of
the first electric machine is configurable as an electric generator during a generator mode of operation; or
the first electric machine is configurable as an electric motor during a motor mode of operation.

14. The assembly of claim 1, further comprising:

a propulsor rotor;

an engine core configured to power rotation of the propulsor rotor, the engine core including the compressor section, the combustor section, the first turbine section and the second turbine section;

an engine case housing the propulsor rotor; and a first electric machine controller electrically coupled between the first electric machine and the electrical system, the first electric machine controller mounted with the engine case.

15. An assembly for an aircraft, comprising:

a fan case;

a core case radially inboard of the fan case;

an accessory gearbox mounted with the fan case;

a first electric machine mounted with the accessory gearbox;

a first electric device mounted with the core case; and an electrical system electrically coupled to the first electric machine and the first electric device, the electrical system configured to receive a first current of electricity from the first electric machine, and the electrical system configured to provide a second current of electricity to the first electric device.

16. The assembly of claim 15, further comprising:

a compressor section, a combustor section, a turbine section and a flowpath extending through the compressor section, the combustor section and the turbine section; and a rotating structure comprising a turbine rotor that is disposed in the turbine section, the rotating structure operatively coupled to a first electric machine rotor in the first electric machine.

17. The assembly of claim 15, further comprising:

a second electric device mounted with the core case, the electrical system electrically coupled to the second electric device, and the electrical system configured to provide a third current of electricity to the second electric device;

a first powerplant system comprising the first electric device; and a second powerplant system comprising the second electric device, the second powerplant system discrete from the first powerplant system.

18. The assembly of claim 15, further comprising:

an airframe component; and a second electric device mounted with the airframe component;

the electrical system further electrically coupled to the second electric device.

19. An assembly for an aircraft, comprising:

a propulsion system including a fan case, a core case, an accessory gearbox and a plurality of electric machines mounted to the accessory gearbox, the core case radially inboard of the fan case, and the accessory gearbox mounted with the fan case or the core case, wherein the accessory gearbox operatively couples each of the plurality of electric machines to a different rotating structure of the propulsion system;

a first electric device disposed within or outside of the propulsion system; and an electrical system electrically coupled to the plurality of electric machines and the first electric device, the electrical system configured to receive a first current of electricity from at least one of the plurality of electric machines, and the electrical system configured to provide a second current of electricity to the first electric device.

20. The assembly of claim 19, further comprising:

an airframe component;

the first electric device disposed outside of the propulsion system and mounted with the airframe component.

\* \* \* \* \*